Patented Jan. 5, 1954

2,665,278

UNITED STATES PATENT OFFICE 2,665,278

GAMMA-HYDROXY QUATERNARY AMMONIUM COMPOUNDS

Everett M. Schultz, Glenolden, Pa., assignor to Merck & Co., Inc., a corporation of New Jersey No Drawing. Application May 9, 1951, Serial No. 225,466

6 Claims. (Cl. 260—294.7)

This invention is concerned with certain new chemical compounds. It is more particularly concerned with the quaternary salts derived from gamma-hydroxy-tertiary amines. The compounds of this invention can be represented by the general formula

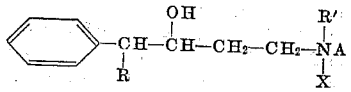

in which NA is a secondary amine residue, R is chosen from the group consisting of lower alkyl, cycloaliphatic, aralkyl, and aryl, R' is chosen from the group consisting of lower alkyl, aralkyl, allyl and cinnamyl and X is an anion.

The starting materials for the compounds of this invention are gamma-hydroxy-tertiary amines the production of which is described in the application of James M. Sprague and Everett M. Schultz, Serial No. 151,044 filed March 21, 1950, now abandoned. These gamma-hydroxy-tertiary amines are prepared by the hydrogenation, in the presence of platinum catalyst, of gamma-keto-tertiary amines in aqueous or alcoholic solution.

In general, the compounds of this invention are prepared by reacting a gamma-hydroxy-tertiary amine with a quaternizing agent of the formula R'X in which R' has the meanings heretofore described and X is for example, halide or methylsulfate. Compounds containing anions other than halide or methylsulfate can be obtained by means of a procedure hereinafter described. The gamma-hydroxy-tertiary amine is admixed with the quaternizing agent, R'X, with or without a solvent and the reaction allowed to proceed at room temperature. In general, the reaction is completed within 12 to 24 hours.

If the above reaction has been carried out without a solvent the reaction product is recrystallized from a suitable solvent, such as ethanol, acetone, or ethylacetate or mixtures thereof. If a solvent has been used purification is effected by one of two methods. If the solvent used is one in which the quaternary ammonium salt is insoluble the salt is separated by filtration and recrystallized as above. If, on the other hand, the solvent is one in which the quaternary ammonium salt is soluble, such as, for example, methanol or ethanol, it is precipitated from the solvent by the addition of a non-polar solvent, such as benzene, ether, or ethyl acetate. The precipitated quaternary ammonium salt is then separated by filtration and recrystallized as above.

The compounds of this invention are illustrated by such compounds as: 3-hydroxy-4-phenylhexyltrimethylammonium iodide, 3-hydroxy-4-phenyl-5 - methylhexyltrimethylammonium iodide, 3-hydroxy-4-phenyl-5-methylhexyltrimethylammonium methylsulfate, 1 - (3 - hydroxy-5-methyl-4-phenylhexyl)-1-methylpiperidinium iodide, 1-benzyl-1-(3-hydroxy-5-methyl-4-phenylhexyl) piperidinium bromide, 1-ethyl-1 - (3 - hydroxy-5-methyl-4-phenylhexyl) piperidinium iodide, 1 - methyl-1-(3-hydroxy-4,4-diphenylbutyl) piperidinium iodide, 3-hydroxy-4,5-diphenylamyltrimethylammonium iodide, 1-(4,5-diphenyl-3-hydroxyamyl)-1-methylpiperidinium iodide, 4 - cyclohexyl-3-hydroxy-4-phenylbutyltrimethylammonium iodide, 3-hydroxy-4-phenylheptyltrimethylammonium methylsulfate.

It is to be understood that the anion which occurs in the foregoing compounds is not of particular importance to the physiological activity. Thus, a variety of anions can be substituted for those listed above and the physiological activity of the compounds will remain. If one desires anions other than those listed above the compounds can be prepared conveniently by admixing the quaternary ammonium bromide or iodide in water solution with silver oxide. There will be obtained a precipitate of silver bromide or iodide which can be removed by filtraton leaving a water solution of the quaternary ammonium hydroxide. By neutralization of this hydroxide with an appropriate acid one can obtain the desired anion. For instance, if one neutralizes with phosphoric acid there is obtained the quaternary ammonium phosphate; if one neutralizes with sulfuric acid there is obtained the quaternary ammonium sulfate and the like. In general, the anions derived from inorganic acids, the lower carboxylic acids, and sulfonic acid are preferred.

The compounds of this invention are useful in that they possess physiological activity of an anticholinergic nature. Of the compounds possessing particular activity, 3-hydroxy-5-methyl - 4 - phenylhexyltrimethylammonium iodide and methyl sulfate and 1-(3-hydroxy-5-methyl - 4 - phenylhexyl)-1-methylpiperidinium iodide are of particular interest because of their high order of activity.

The compounds of this invention are illustrated by but not necessarily restricted to, the following preferred embodiments:

*Example 1.—Preparation of 3-hydroxy-5-methyl - 4 - phenylhexyltrimethylammonium io-dide.* 2.4 grams (0.01 mole) 1-phenyl-1-isopropyl-4-dimethylamino-2-butanol, was dissolved in 20 ml. ethyl ether and there was added 7.0 grams (0.05 mole) methyl iodide. The reaction mixture was allowed to stand at room temperature for approximately 2 hours. There was obtained a crystalline reaction product which was separated from the ether by filtration and recrystallized from approximately 10–15 ml. isopropyl alcohol. There was obtained 3.0 grams of 3-hydroxy-5-methyl-4-phenylhexyltrimethylammonium iodide, M. P. 157–8° C.

An aqueous solution of 3-hydroxy-5-methyl-4-phenylhexyltrimethylammonium iodide was treated with excess silver oxide and stirred for approximately 30 minutes. The precipitated silver iodide and excess silver oxide were removed by filtration yielding an aqueous solution of the quaternary ammonium hydroxide. Portions of this solution were neutralized with phosphoric, acetic, sulfuric, p-toluenesulfonic and benzoic acids and the solutions evaporated to dryness. There were obtained 3-hydroxy-4-phenyl-5-methylhexyltrimethylammonium phosphate, acetate, sulfate, p-toluenesulfonate, and benzoate respectively. Neutralization of the quaternary ammonium hydroxide above prepared with any desired acid results in the introduction of acidic anion into the molecule.

*Example 2.—Preparation of 1-(3-hydroxy-5-methyl-4-phenylhexyl)-1-methylpiperidinium iodide.* 18.6 grams (0.06 mole) of 1-isopropyl-1-phenyl-4-(1-piperidyl)-2-butanone hydrochloride (prepared by the reaction of 3-phenyl-4-methyl-2-pentanone with paraformaldehyde and piperidine hydrochloride according to the Mannich reaction) was dissolved in 500 ml. water and there was added 0.9 gram Adam's platinum oxide catalyst and the entire mixture was shaken under an atmosphere of hydrogen until the uptake of hydrogen ceased. This required approximately 24 hours. The catalyst was separated from the reaction mixture by filtration and the filtrate made basic with 20% sodium hydroxide solution. The oil that separated, 1-isopropyl-1-phenyl-4-(1-piperidyl)-2-butanol, was taken up in 250 ml. benzene and the benzene layer separated from the water layer. The benzene layer was washed 4 times with 100 ml. water. The benzene solution was dried by distilling off approximately 100 ml. of benzene.

The benzene solution was allowed to cool and there was added 7.5 ml. methyl iodide and the mixture was allowed to stand at room temperature for approximately two days.

There was obtained a crystalline product which was separated from the benzene by filtration. The product was recrystallized from 220 ml. acetone. There was obtained 17.0 grams of 1-(3-hydroxy-5-methyl-4-phenylhexyl)-1-methylpiperidinium iodide, M. P. 150–1° C.

*Example 3.—Preparation of 4-cyclohexyl-3-hydroxy-4-phenylbutyltrimethyl-ammonium iodide.* Following the procedure outlined in Example 1 and substituting for the amino butanol there used an equimolar quantity of 1-phenyl-1-cyclohexyl-4-dimethylamino-2-butanol there was obtained 4-cyclohexyl-3-hydroxy-4-phenylbutyltrimethylammonium iodide, M. P. 174.5–176° C.

*Example 4.—Preparation of 3-hydroxy-4,5-diphenylamyltrimethylammonium iodide.* Following the procedure outlined in Example 1 and substituting for the amino butanol there used an equimolar quantity of 1-phenyl-1-benzyl-4-dimethylamino-2-butanol, there was obtained 3-hydroxy-4,5-diphenylamyltrimethylammonium iodide, M. P. 222–223° C.

*Example 5.—Preparation of 3-hydroxy-4-phenylhexyltrimethylammonium iodide.* Following the procedure outlined in Example 1 and substituting for the amino butanol there used an equimolar quantity of 1-phenyl-1-ethyl-4-methylamino-2-butanol there was obtained 3-hydroxy-4-phenylhexyltrimethylammonium iodide, M. P. 135–137° C.

*Example 6.—Preparation of 1-methyl-1-(3-hydroxy-4,4-diphenylbutyl)-piperidinium iodide.* 3.7 grams (0.012 mole) 1,1-diphenyl-4-(1-piperidyl)-2 butanol was dissolved in 20 ml. of ethanol. There was added 8.5 grams (0.06 mole) of methyl iodide. A crystalline solid began to separate after approximately 5 minutes. The reaction mixture was chilled to approximately 5° C. and the ethanol removed by filtration. The crystalline product was recrystallized from approximately 70 ml. of a 4:1 methanol-water mixture. There was obtained 1-methyl-1-(3-hydroxy-4,4-diphenylbutyl) piperidinium iodide, M. P. 244–5° C.

*Example 7.—Preparation of 1-(4,5-diphenyl-3-hydroxyamyl)-1-methyl-piperidinium iodide.* Following the procedure outlined in Example 1 and substituting for the amino butanol there used an equimolar quantity of 1-phenyl-1-benzyl-4-(1-piperidyl)-2-butanol, there was obtained 1-(4,5-diphenyl-3-hydroxyamyl)-1-methylpiperidinium iodide, M. P. 152° C.

*Example 8.—Preparation of 1-ethyl-1-(3-hydroxy-5-methyl-4-phenylhexyl)-piperidinium iodide.* Following the procedure outlined in Example 6 and substituting for the amino butanol there used an equimolar quantity of 1-phenyl-1-isopropyl-4-(1-piperidyl)-2-butanol and an equimolar quantity of ethyl iodide in place of the methyliodide there used there was obtained 1-ethyl-1-(3-hydroxy-5-methyl-4-phenylhexyl)-piperidinium iodide, M. P. 142–3° C.

*Example 9.—Preparation of 1-benzyl-1-(3-hydroxy-5-methyl-4-phenylhexyl)-piperidinium bromide.* Following the procedure outlined in Example 6 and substituting for the amino butanol there used an equimolar quantity of 1-phenyl-1-isopropyl-4-(1-piperidyl)-2-butanol and equimolar quantity of benzyl bromide for the methyl iodide there used, there was obtained an ethanol solution of the desired compound. There was added to the ethanol solution 5 volumes of ether and the product precipitated. The ether-ethanol was decanted off and to the residue there was added a quantity of water sufficient to dissolve the compound at the boiling point of water. Upon cooling the water solution a crystalline material precipitates which was separated from the water by filtration and recrystallized from a 4:1 (by volume) mixture of ethylacetate and isopropyl alcohol. There was obtained 1-benzyl-1-(3-hydroxy-5-methyl-4-phenylhexyl) piperidinium bromide, M. P. 123–8° C.

*Example 10.—Preparation of 3-hydroxy-5-methyl-4-phenylhexyltrimethylammonium methylsulfate.* Following the procedure outlined in Example 1 and substituting for the methyl iodide there used an equimolar quantity of dimethylsulfate there was obtained 3-hydroxy-5-methyl-4-phenylhexyltrimethylammonium methylsulfate, M. P. 133–4° C.

*Example 11.—Preparation of 3-hydroxy-4-phenylheptyltrimethylammonium methylsulfate.* Following the procedure outlined in Example 1 and substituting for the amino butanol there used an equimolar quantity of 1-phenyl-1-n-propyl- 4-dimethylamino-2-butanol and an equimolar quantity of dimethylsulfate for the methyl iodide there used, there was obtained 3-hydroxy-4-phenylheptyltrimethylammonium methylsulfate, M. P. 138.5–139.5° C.

It is to be realized that following the procedures of the foregoing examples any of the compounds of the general formula

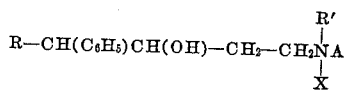

can be prepared by using appropriate starting materials.

What is claimed is:
1. Compounds of the formula

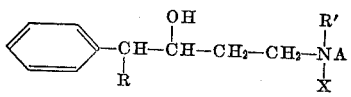

in which R is chosen from the group consisting of lower alkyl, unsubstituted mononuclear alicyclic, mononuclear aralkyl hydrocarbon and mononuclear aryl hydrocarbon radicals; R' is chosen from the group consisting of lower alkyl, mononuclear aralkyl hydrocarbon, allyl and cinnamyl, NA is chosen from the group consisting of a di-lower alkyl amine and piperidine, and X is a non-toxic anion.

2. 3-hydroxy - 5 - methyl - 4 - phenylhexyltrimethylammonium methylsulfate.
3. 1-(3-hydroxy-5-methyl-4-phenylhexyl) - 1 - methylpiperidinium iodide.
4. 3 - hydroxy - 4 - phenylheptyltrimethylammonium methylsulfate.
5. 1 - (3 - hydroxy-5-methyl-4-phenylhexyl) - 1-ethylpiperdinium iodide.
6. 3 - hydroxy - 4 - cyclohexyl-4-phenylbutyltrimethylammonium iodide.

EVERETT M. SCHULTZ.

References Cited in the file of this patent

FOREIGN PATENTS

| Number | Country | Date |
|---|---|---|
| 240,363 | Switzerland | May 16, 1946 |
| 265,665 | Switzerland | Apr. 1, 1950 |

OTHER REFERENCES

Ruddy, Abstract of paper, 110 meeting A. C. S., September 1946, pp. 14K–16K.

Adamson, J. Chem. Soc. (London), May 1949, part E, pp. S144–S155.

Cunningham, J. Pharm. and Exp. Thera., June 1949, pp. 151–165.

Idson, Chem. Reviews, vol. 47 (December 1950), No. 3, pp. 513–515.

Lutz et al., J. Org. Chem. 12, 768 (1947).